United States Patent [19]

Ishii et al.

[11] 4,407,691
[45] Oct. 4, 1983

[54] METHOD AND APPARATUS FOR PERFORMING HOT AIR WELDING OF THERMOPLASTIC RESIN PARTS

[75] Inventors: Masami Ishii, Toyota; Nobuharu Kato, Nagoya; Mikio Hota, Toyota, all of Japan

[73] Assignee: Aisin Seiki Kabushiki Kaisha, Kariya, Japan

[21] Appl. No.: 299,136

[22] Filed: Sep. 3, 1981

Related U.S. Application Data

[62] Division of Ser. No. 136,050, Mar. 31, 1980, Pat. No. 4,315,791.

[30] Foreign Application Priority Data

Apr. 19, 1979 [JP] Japan .................................. 54/48386

[51] Int. Cl.³ ......................... B29C 25/00; C09J 5/00
[52] U.S. Cl. ..................... 156/304.2; 156/82; 156/304.6; 156/309.9; 156/497; 264/DIG. 76
[58] Field of Search ..................... 156/82, 73.2, 304.6, 156/391, 497, 74, 304.1, 304.2, 73.5, 304.5, 309.9, 322, 327; 228/44.5, 48, 49 B, 902, 212, 219; 264/345, 234, DIG. 76

[56] References Cited

U.S. PATENT DOCUMENTS

| | | | |
|---|---|---|---|
| 2,229,329 | 1/1941 | Kaspar | 156/82 |
| 3,024,349 | 3/1962 | Hinrichsen et al. | 228/48 |
| 3,053,726 | 9/1962 | Larson et al. | 156/304.6 |
| 3,128,215 | 4/1964 | Hood | 156/82 |
| 3,860,468 | 1/1975 | Scherer | 156/73.5 |
| 3,959,058 | 5/1976 | Rath et al. | 156/304.2 |
| 3,968,195 | 7/1976 | Bishop | 156/82 |
| 4,094,725 | 6/1978 | Takeda et al. | 156/497 |

*Primary Examiner*—Edward C. Kimlin
*Assistant Examiner*—Louis Falasco
*Attorney, Agent, or Firm*—Finnegan, Henderson, Farabow, Garrett & Dunner

[57] ABSTRACT

Thermoplastic resin parts are opposingly placed from each other and a concentrated blast of hot air is applied to opposite areas of these parts to be welded while the parts are rotating. After melting the opposing areas of these parts by application of the hot air thereto, the parts are then forced into integral contact with each other.

3 Claims, 3 Drawing Figures

(a)

(b)

(c)

(d)

METHOD AND APPARATUS FOR PERFORMING HOT AIR WELDING OF THERMOPLASTIC RESIN PARTS

This is a division of application Ser. No. 136,050, filed Mar. 31, 1980, now U.S. Pat. No. 4,315,791.

The present invention relates to method and apparatus for performing hot air welding of thermoplastic resin parts. The present invention is particularly suitable for welding hollow thermoplastic resin parts, but it is not limited to such applications.

Conventionally, hot air welding of hollow parts of a thermoplastic resin has been performed by use of a hot air generator which is manually moved along the peripheries of the plastic parts so as to apply heat thereto and at the same time, by use of a welding bar which is applied to joints or junctions between the parts to be welded. A depressing roller or plate may be used for applying the molten material of the welding bar to the junction.

The prior process, however, is in convenient in that same requires the use of a welding bar and the welded portion has a poor appearance.

It is therefore an object of the present invention to provide a hot air welding process in which thermoplastic resin parts, which are rotated, are molten throughout the peripheries thereof before they are connected together.

Another object of the present invention is to provide an apparatus in which workpieces are rotated and applied with hot air which is concentrated to a limited area so that the workpieces are molten throughout their peripheries and connected together.

According to the present invention, the above and other objects can be accomplished by a method for welding a pair of thermoplastic resin parts along their peripheries, the method comprising steps of placing the parts to be welded so that their peripheries oppose each other, rotating the parts while a concentrated blast of hot air is applied to the peripheries of the parts to thereby melt the peripheries of the parts, and forcing the parts toward each other so that the molten peripheries are integrally connected together.

The apparatus for carrying out the above process comprises means for holding a pair of thermoplastic resin parts with peripheries thereof opposed to each other with a clearance therebetween, means for rotating the holding means, hot air nozzle means for blowing hot air toward the peripheries of the parts and means for forcing the parts toward each other so that the peripheries of the parts are brought into contact with each other. In a preferable aspect of the present invention, the holding means comprises a rotatable cylinder having an end face for supporting one of the parts and a guide member axially movable with respect to the rotatable cylinder and projecting from the end face of the cylinder, the guide member having an end face for supporting the other of the parts, the guide member being yieldably forced in a direction in which it is projected from the cylinder but capable of being moved in the opposite direction by the forcing means so that the peripheries of the parts are forced into contact with each other. Preferably, the forcing means comprises a swingable arm which is swingable between an operative position wherein it engages the other part on the guide member for forcing it toward the other part and an inoperative position wherein it is away from the other part.

According to the above features of the present invention, the nozzle means may be of a simple construction since it merely concentrate the hot air blast toward a limited spot on the parts to be welded.

The above and other objects and features of the present invention will become apparent from the following descriptions of a preferred embodiment with reference to the accompanying drawings, in which.

Figure 1:
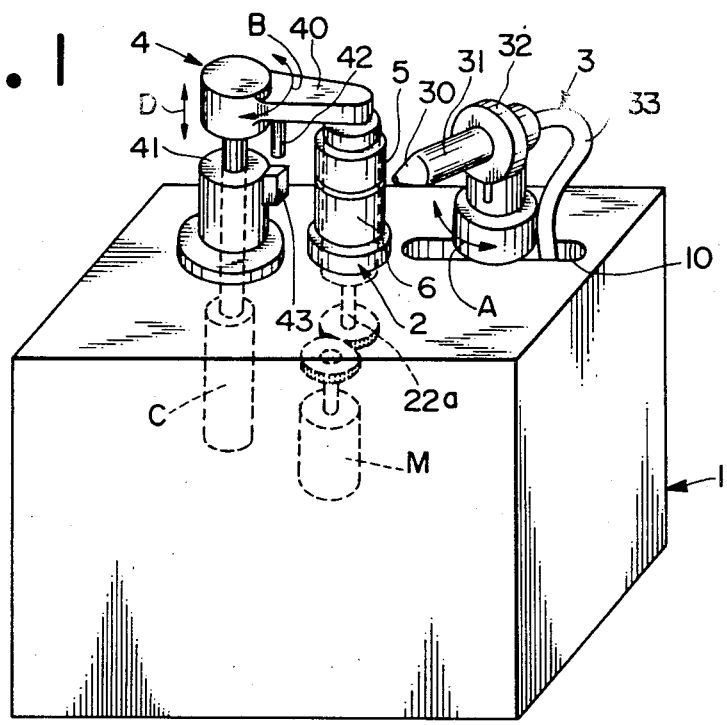
FIG. 1 is a perspective view of a hot air welding apparatus in accordance with one embodiment of the present invention.
Figure 2:
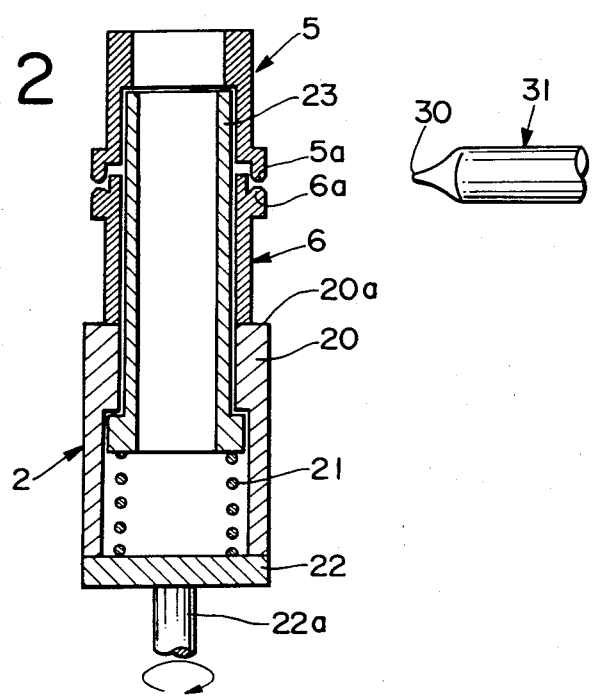
FIG. 2 is a sectional view of the workpiece holding device in the apparatus shown in FIG. 1.

Referring now to the drawings, particularly to FIG. 1, there is shown a hot air welding apparatus which includes a body 1 having a rigidity sufficient to support each member of the apparatus. The body 1 carries a workpiece holding device 2 which, as shown in FIG. 2, has a rotatable cylinder 20 mounted on a rotatable disc 22. The rotatable disc 22 has a drive shaft 22a which is driven through an appropriate gear train by an electric motor M. In the cylinder 20, there is mounted a guide member 23 which is axially movable with respect to the cylinder 20 and projects upwardly from the cylinder 20. A spring 21 is disposed in the cylinder 20 so as to force the guide member upwardly.

As shown in FIG. 2, the rotatable cylinder 20 has a top end face 20a for supporting a cylindrical workpiece 6 of a thermoplastic resin material. The guide member 23 is of an outer diameter which is slidably received by the workpiece 6 and maintains the workpiece 6 in an upright position. Another workpiece 5 of a thermoplastic resin material is supported on the top end of the guide member 23. The workpieces 5 and 6 have peripheries 5a and 6a, respectively, which are to be welded together. In the illustrated position of the holding device 2, the workpieces 5 and 6 are held with the peripheries 5a and 6a opposed to each other with a clearance therebetween.

On the body 1, there is also provided a hot air blasting device 3 which includes a hot air discharging nozzle 30 formed at an end of a heating unit 31 containing an electrical heating element (not shown) therein. The heating unit 31 is carried by a support 32 which is mounted on the body 1 for rotation as shown by an arrow A in FIG. 1 so that the heating unit 31 can be swung between an operative position wherein the nozzle 30 is located close to the peripheries 5a and 6a of the workpieces 5 and 6 and an inoperative position wherein the nozzle 30 is apart from the peripheries of the workpieces 5 and 6. An appropriate rotary actuator may be provided for the purpose. The heating unit 31 is connected at its other end to an air tube 33 so that air is supplied through the tube 33 to the heating unit 31 to be heated thereby. Preferably, the heater support 32 is mounted on the body 1 of the apparatus through an elongated slot 10 so that the position of the nozzle 30 may be adjusted to accomodate the apparatus for workpieces of different diameters. The heating unit 31 may be associated with an appropriate temperature control device (not shown) which may include a temperature sensing element for detecting the temperature of the hot air passing through the nozzle 30. It will be understood that with the arrangement described above, a blast of hot air is directed to the workpieces 5 and 6 and concentrated to the peripheries 5a and 6a.

The body 1 of the apparatus further carries a depressing device 4 which includes a swingable arm 40 mounted on the body 1 by means of a support 41 for swingable movement in a horizontal plane, as shown by an arrow B in FIG. 1, between an operative position wherein the free end of the arm 40 is located just above the workpiece 5 and an inoperative position wherein the arm 40 is moved away from the workpiece 5. The arm 40 is connected to an actuator C so that it can be moved in the vertical direction as shown by an arrow D. In order to limit the downward movement of the arm 40, the arm 40 is provided with an adjustable stopper bolt 42 which is adapted to engage a stopper 43 on the stopper 41.

Figure 3:
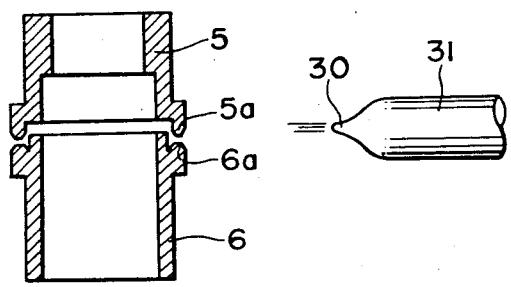
FIG. 3 shows the sequential steps of the welding process of the present invention through (a) to (d).
Figure 3:
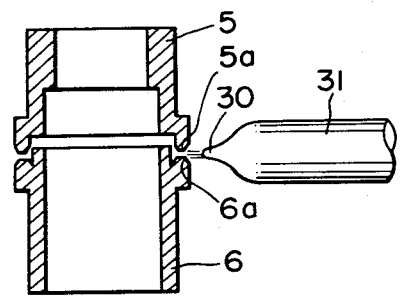
Figure 3:
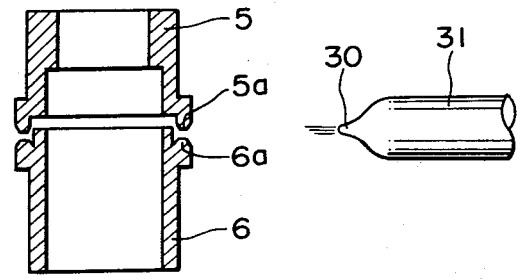
Figure 3:
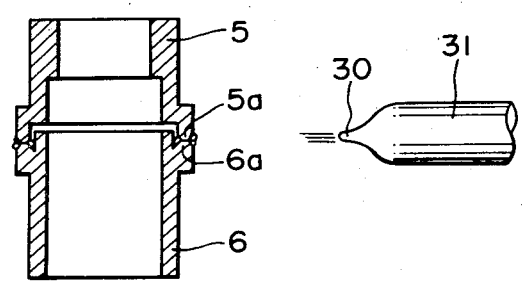

In operation, the heater in the unit 31 is energized with the nozzle 30 in the inoperative position as shown in FIG. 3 (a) and hot air is blown through the heating unit 31. After a certain warming up period, for example, of 5 minutes, the nozzle 30 is moved to the operative position as shown in FIG. 3 (b). Preferable temperature of the blast air is 300° to 450° C. The rotatable table 22 and cylinder 20 are then driven to rotate the workpieces 5 and 6 supported thereon. The blast of hot air from the nozzle 30 is directed to the peripheries 5a and 6a of the workpieces 5 and 6 so that the peripheries 5a and 6a are molten under the heat of the blast hot air.

After a certain period, for example, of 20 seconds, the nozzle 30 is moved to the inoperative position as shown in FIG. 3 (c). The depressing arm 40 is then moved to the operative position and the actuator C is energized to move the arm 40 downwardly to thereby force the workpiece 5 toward the workpiece 6 against the action of the spring 21. The peripheries 5a and 6a of the workpieces 5 and 6 are thus brought into contact with each other so that they are integrally connected together as shown in FIG. 3 (d).

The welding operation is completed in, for example, about 20 seconds.

According to the present invention, it is not required to use a welding bar and is possible to provide a fine-finished welding having good appearance. Further, the nozzle as adopted in the apparatus of the present invention is simple in construction so that the apparatus can be inexpensively manufactured.

The invention has thus been shown and described with reference to a specific embodiment, but, however, it should be noted that the invention is in no way limited to the details of the illustrated structures, but changes and modifications may be made without departing from the scope of the appended claims. For example, although the workpieces are of hollow cylindrical form in the illustrated embodiment, the present invenrtion can be well-applied to the welding of solid workpieces. Further, the present invention can also be applied to workpieces of a non-circular cross-section. In such a case, the nozzle may be combined with a cam device so that the nozzle can be moved to and away from the workpiece in accordance with the cross-sectional configurations of the workpieces.

We claim:

1. A process for welding a pair of thermoplastic resin parts along their peripheral surfaces comprising the steps of holding one of said parts on an end face of a rotatable cylinder and the other of said parts on an end face of an axially movable guide member having a portion projecting from the end face of the cylinder with the peripheral surfaces of the parts opposed to and spaced from each other, rotating said cylinder and guide member in the same direction and at the same speed, so that said parts are rotated at the same speed, positioning a nozzle means in an operative position and blowing hot air through said nozzle means toward the peripheral surfaces of said rotating parts while said peripheral surfaces are spaced from each other causing said peripheral surfaces to melt, forcing said parts toward each other to bring the melted peripheral surfaces into integral contact with each other causing the parts to be welded together, and displacing the nozzle means to an inoperative position and removing the welded parts from the cylinders.

2. The method as claimed in claim 1, further including the steps of providing spring means between the cylinder and the guide member normally biasing the thermoplastic parts away from each other.

3. The method as claimed in claim 2, said step of forcing said parts toward each other including the step of swinging a forcing means into operative engagement with the part on the guide member, and forcing it toward the other part.

* * * * *